United States Patent [19]

Vicik

[11] Patent Number: 5,737,611
[45] Date of Patent: Apr. 7, 1998

[54] METHODS FOR DYNAMICALLY ESCALATING LOCKS ON A SHARED RESOURCE

[75] Inventor: Frederic Otto Vicik, Issaquah, Wash.

[73] Assignee: Microsoft Corporation, Redmond, Wash.

[21] Appl. No.: 628,472

[22] Filed: Apr. 5, 1996

[51] Int. Cl.⁶ .................................................. G06F 12/00
[52] U.S. Cl. ............................ 395/726; 395/608; 395/477
[58] Field of Search ................................. 395/726, 477, 395/608

[56] References Cited

U.S. PATENT DOCUMENTS

| | | | |
|---|---|---|---|
| 4,480,304 | 10/1984 | Carr et al. | 395/726 |
| 4,679,137 | 7/1987 | Lane et al. | 395/670 |
| 4,716,528 | 12/1987 | Crus et al. | 395/726 |
| 4,914,570 | 4/1990 | Peacock | 395/726 |
| 5,414,839 | 5/1995 | Joshi | 395/726 |
| 5,613,139 | 3/1997 | Brady | 395/800 |
| 5,615,373 | 3/1997 | Ho | 395/726 |

*Primary Examiner*—Ayaz R. Sheikh
*Attorney, Agent, or Firm*—Duft, Graziano & Forest, P.C.

[57] ABSTRACT

A computer operable method and associated apparatus for dynamically escalating low granularity locks on a shared resource to higher granularity locks. When the number of low granularity locks exceeds a plurality of escalation threshold parameters, allocated low granularity locks for a particular user (process) are escalated to a higher granularity lock to thereby free the low granularity locks for re-use by other processes. The plurality of escalation threshold parameters permit more flexible tuning of escalation criteria as compared to prior techniques. The escalation threshold parameters may be varied according to the needs of particular computing systems, performance criteria, or other considerations. Additional features of the invention enable the automated adjustment of the plurality of escalation threshold parameters by operation of the computer system monitoring performance and loading parameters of the system.

23 Claims, 6 Drawing Sheets

METHODS FOR DYNAMICALLY ESCALATING LOCKS ON A SHARED RESOURCE

FIELD OF THE INVENTION

The invention relates to locking of resources in a computing environment and in particular the invention relates to dynamically escalating locks on a shared resource from lower granularity to higher granularity.

PROBLEM

It is common in computing applications to share common resources among a plurality of cooperating processes. To coordinate the activity of such a plurality of cooperating processes, it is known to use a lock mechanism to permit each process to indicate its required level of access. Such a lock may indicate, for example, that a process (task) requires exclusive access for write access to modify the shared resource or shared access such as for read only access to the shared resource.

Locks also known as semaphores or mutex meaning MUTual EXclusion, may have varying levels of granularity with respect to the shared resource. A low granularity lock defines the task's access to the shared resource with respect to a portion of the shared resource. For example, as applied to a database table as a shared resource, a low granularity (low level) lock may lock a single record (row) or group of records of the database table. Depending upon restrictions of the underlying operating system, a low granularity lock may lock a group of records within a common physical or virtual memory page. A high level (high granularity) lock may, for example, lock the entire shared resource (e.g., all rows of a database table). In addition, a lock may be categorized as either exclusive or shared. An exclusive lock assures the exclusive use of the shared resource by the locking process. A shared lock allows access by other processes to the shared locked resource through use of shared locks by the other processes but excludes a process seeking to exclusively lock the shared resource. For example, a shared lock may be used by a process to secure read only access to the shared resource. Each of a plurality of processes requiring read access to the shared resource may apply a shared lock to the shared resource or a portion thereof. Any one such shared lock serves to exclude a process seeking to apply an exclusive lock over the shared resource or a locked portion thereof. An exclusive lock serves to exclude all other processes seeking to lock the shared resource or the same portion thereof.

Semaphores (mutex) features of an operating system are typically utilized to implement locks on a computer system supporting access to the shared resource. The number of such semaphores within the operating system may be limited due to implementation requirements of the operating system. Semaphores, and hence locks, are therefore valuable resources themselves within a computing system. It is therefore a problem to minimize use of such locks within a computing system.

Prior techniques that limit the use of locks promote or escalate low granularity locks to higher granularity locks to reduce the total number of locks used by each user of the shared resource. In other words, a plurality of low granularity locks associated with a user of the shared resource, for example, record or page level locks, are escalated to a single higher granularity lock, for example, a table lock. Once escalated to a single higher level (higher granularity) lock, the low level locks are released for re-use by other applications on the operating system. Escalation is transparent to the user in that the user need not explicitly request the escalation. Methods known in the art determine when an escalation is desirable.

In particular, prior techniques determined the desirability of an escalation by comparing the number of lower level locks held by a given user to a fixed threshold value. If the number of lower level locks asserted by a user over a shared resource exceeds the threshold, the lower level locks are escalated to a single higher level lock which locks, at least, the same regions of the shared resource locked by the union of the user's lower level locks. However, comparison of the number of locks to a single, fixed escalation threshold provides limited flexibility in defining a threshold in accordance with varying operational parameters of the operating system. A single fixed threshold value cannot account for variance in the threshold depending upon external factors.

From the above discussion it can be seen that a need exists for an improved method of determining the desirability of escalation of lower granularity locks to higher level granularity locks on a shared resource.

SOLUTION

The present invention solves the above and other problems, thereby advancing the state of the useful arts, by providing an improved method for determining the desirability of escalating lower level locks on a shared resource to a higher level lock. In particular the present invention provides a method for comparing the number of locks against a plurality of threshold parameters and determining the desirability of escalation based upon the evaluation of a boolean predicate involving the plurality of comparisons. In addition, the comparison threshold parameters may be expressed both as absolute threshold values or as dynamic parameters whose present value is determined at the time of the comparison. The method of the present invention permits a wider variety of determination criteria to be expressed than is possible under prior techniques known to the art.

The methods of the present invention express threshold parameters for determining when to escalate locks in the form of a plurality of minimum and maximum values and percentages relating to parameters of the underlying operating system. A minimum value is used to express the minimum value required of an identified parameter of the operating system before escalation is desirable. A minimum percentage is used to express the minimum percentage of an identified parameter used by a single user versus the total potential value of the parameter available in the operating system. Similarly, a maximum threshold value and maximum threshold percentage are used to express maximum values and percentage of an identified parameter of the underlying operating system required before escalation is desired. By combining various minimum and maximum value and percentage threshold value comparisons in a boolean predicate statement, a rich set of conditions may be specified to determine the desirability of lock escalation based upon one or more parameters of the underlying operating system.

Threshold parameters may be used to express limits that are local to a particular task or global with respect to the system. For example, a minimum or maximum threshold value may be used to specify an absolute value of the number of allocated locks local to a particular process before escalation is desirable. Such a threshold parameter may be considered local in that it bases the escalation decision solely upon a parameter local to the particular process. A minimum or maximum percentage parameter may be specified which determines escalation desirability based upon the percentage of the number of locks allocated to the process versus the total dumber of locks available in the operating system. Such a threshold parameter is global in the sense that it determines the desirability of escalation based upon a parameter value global to the computing system. The methods of the present invention therefore permit balancing of local and global escalation criteria.

In particular, the methods of the present invention are operable to test the number of lower level locks allocated to a particular process to lock portions of a particular shared resource against three threshold parameters. First, the number of locks is compared against a maximum number of locks before escalation is deemed desirable, Second, the number of locks is compared to both a minimum number of locks value and a maximum percentage of available locks to determine if the escalation is deemed desirable in view these comparisons. An escalation is deemed desirable if the maximum number of locks allocated threshold value is exceeded or if the minimum number of locks threshold value and the maximum percentage threshold value are both exceeded.

In a preferred embodiment of the methods of the present invention, the number of low level locks allocated to a particular process is compared to a single threshold. However, unlike known prior techniques, the single threshold value is computed as a function of a plurality of escalation threshold parameters. This computation is performed frequently to update the single threshold value so as to more accurately reflect changes in the status of the underlying operating system. The number of low level locks (or other operating parameter) is then compared to a plurality of escalation threshold parameters in that it is compared to the threshold value computed as a function of a plurality of escalation threshold parameters.

The escalation threshold parameters may be adjusted by a system administrator to tune the lock escalation determinations in accordance with the performance requirements of a particular computing environment. Additional features of the present invention include automatic tuning of the escalation threshold parameters by heuristic techniques within the computing system in response to performance measurements of the operating system.

DETAILED DESCRIPTION OF THE INVENTION

Computing Environment Overview

Figure 1:
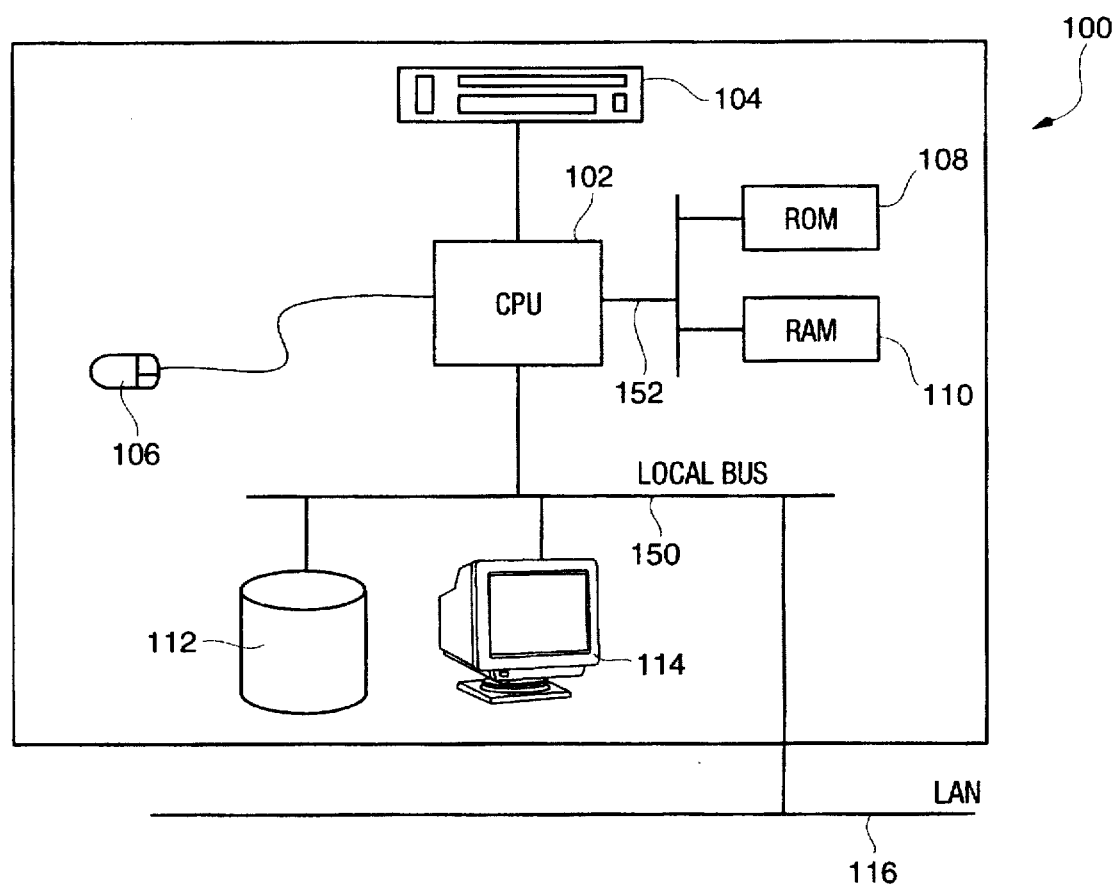
FIG. 1 is a block diagram of a typical computing environment in which the methods and structures of the present invention may be advantageously applied.

The methods of the present invention are useable in any of several standard computing systems generally available in the industry. FIG. 1 depicts a typical computing system 100 in which the methods and structures of the present invention may be advantageously applied. The methods of the present invention are performed by execution of programmed instructions within the CPU 102. CPU 102 stores and/or retrieves programmed instructions and/or data from ROM 108 and RAM 110 via memory bus 152. The methods of the present invention operable within CPU 102 receive user input via keyboard 104 and pointing device 106. Various peripheral I/O devices are attached to CPU 102 via local bus 150. Specifically, mass storage device 112 (i.e., disk storage devices), graphical display 114, and local area network (LAN) 116 are all attached to CPU 102 via local bus 150.

The methods of the present invention are operable within CPU 102 to manage the use of locking semaphores (also referred to herein as mutex or simply locks) on the computing system 100 associated with a shared resource. A shared resource may be, for example, a database stored on mass storage device 112 or simply one table, page, or record within such a database. One of ordinary skill in the art will readily recognize that the methods of the present invention are equally applicable where, for example, a database (a shared resource) being manipulated is stored remotely and is accessible via LAN 116 using well known distributed computing and network communication techniques. More generally, one of ordinary skill in the art will readily recognize that LAN 116 may represent any computer network communication subsystem in which a database (a shared resource) may be remotely accessed by another computer. Similarly, input obtained via pointing device 106 or keyboard 104 may be generated by other user input devices and techniques such as so-called pop-up or pull-down menu graphical user interface operations.

Locks allocated by processes utilizing the shared resource (database) define a region of the shared resource for which the process requires a particular type of exclusive access. Such locks are typically implemented by programming constructs and data structures stored in the memory of the computer system 100 (e.g., in ROM 108 and/or RAM 110). Such programming constructs are commonly referred to as semaphores or mutex (as in MUTual EXclusion). Cooperating processes within computer system 100 manipulate a shared resource by asserting a type of exclusive access indicated by the allocation and assertion of a lock. Cooperating processes are suspended if their respective attempts to allocate and assert a lock conflicts with the exclusive access granted to others of the cooperating processes. One of ordinary skill in the art will readily recognize a wide variety of equivalent methods and structures for implementation of locks and the underlying semaphores.

Lock Escalation

A shared resource may be viewed as an entity comprised of a plurality of subcomponents or regions. The resource therefore has a spectrum of granularity levels from which it may be viewed ranging from the smallest quantum of access, such as a record or field within a record of a database table, through the entirety of the resource including all subcomponents. Locks may be allocated corresponding to varying levels of granularity of the shared resource. A lower level (lower granularity) lock is associated with a smaller portion of the entire resource as compared to the portion of the resource associated with a higher level (higher granularity) lock. In particular, for example as applied to database technologies, a high granularity (high level) lock may apply to an entire table of the database while a low granularity (low level) lock may apply to a single record or page of a table. One of ordinary skill in the art will readily recognize that there exists a spectrum of granularity in the subcomponents which may comprise a shared resource.

As discussed above, it is a problem in computing systems when low level locks proliferate due to cooperative processing associated with a shared resource. The underlying semaphore structures used to implement locks tend to be valuable resources within a computing system. Low level locks protect smaller portions of the shared resource. A single higher level lock provides protection for larger portions of the shared resource, essentially overlapping the protection provided by a plurality of low level locks. It is therefore known in the art to escalate low level locks to higher level locks in order to reduce the usage of semaphore (mutex) structures in the underlying operating system. The methods of the present invention, as summarized above, improve the process of determining when to escalate lower level locks to higher level locks by permitting broader flexibility in the evaluation criteria.

The methods of the present invention are applicable to all techniques which seek to escalate a lock from any lower level of granularity to any higher level of granularity. The two level granularity described herein with respect to database technologies is exemplary of one application of the methods of the present invention.

Figure 2:
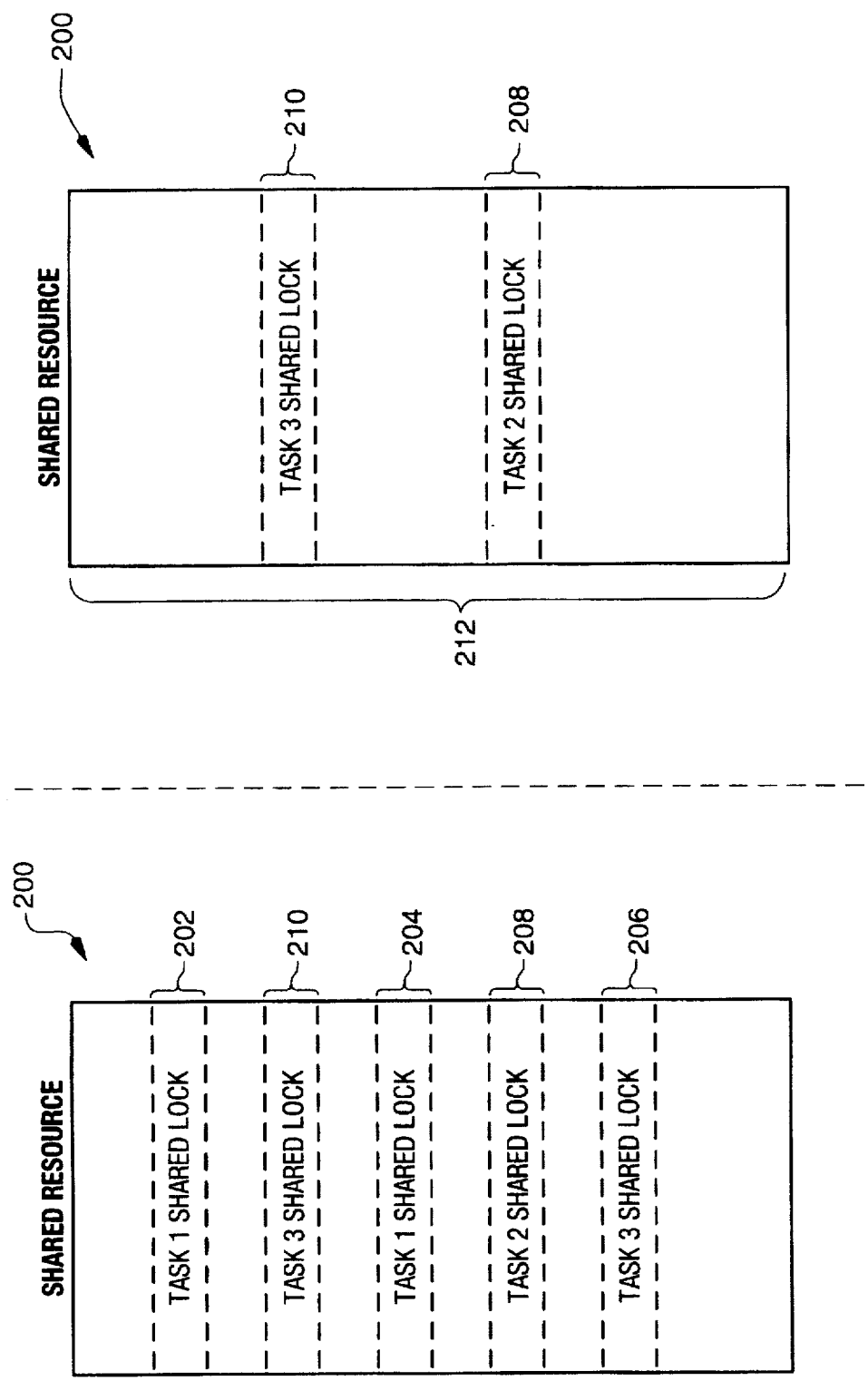
FIG. 2 is a block diagram depicting a before and after status for locks allocated on a shared resource.

FIG. 2 is a block diagram graphically depicting a plurality of low granularity locks being escalated to higher granularity locks on a shared resource (e.g., a database or database table). On the left side of the dashed vertical line of FIG. 2 is a block diagram of a shared resource 200 having a plurality of low granularity locks 202–210 associated therewith. Low granularity locks 202–210 are allocated by processes using the shared resource 200 in a cooperative manner. Each low granularity lock 202–210 corresponds to a process (task) which allocated the lock and serves to identify, for that particular process, a type of exclusive access to a region or portion of the shared resource 200. Locks 202, 204, and 206 each identify a region of shared resource 200 in which an associated process named "TASK 1" is to maintain a shared type of exclusive access. In like manner, low level lock 208 identifies a region of shared resource 200 with a shared type of exclusive access allocated by a process named "TASK 2." Lock 210 identifies a region of shared resource 200 with a shared type of exclusive access allocated by a process named "TASK 3."

The block diagram on the right side of the vertical dashed line of FIG. 2 graphically depicts the same shared resource 200 with all low level locks associated with the "TASK 1" process escalated to a single high level lock 212. The new high level lock 212 is identically associated with the "TASK 3" process but encompasses the entirety of the shared resource 200 rather than a plurality of regions or portions as noted above. Lower level locks 202, 204, and 206 have been freed for re-use with respect to other regions and/or other processes. The process of escalating low level locks to higher level locks, as exemplified in FIG. 2, reduces the total number of used locks from five to three.

Shared/Exclusive Locks and Conflicts

Locks can specify one of at least two types of exclusive access, namely: shared read access or exclusive write access. Shared read access is used to permit any number of other processes to share the locked portion or region, but only for purposes of reading the contents thereof. All other processes may continue to operate for purposes of reading the region locked for shared read access. However, any process requiring write access to the shared read locked region must await release of the shared read locks. Exclusive write access enforces complete exclusivity of use over the associated region. Only the process which successfully allocates an exclusive write lock associated with the shared resource may access the shared resource. All other processes requiring access to the locked region must suspend awaiting release of the exclusive write access locked region.

Before escalating one or more low level locks to a single higher level lock, the methods of the present invention first determine whether any other locks conflict with the region protected by the higher level lock. A lock is said to conflict with another lock if their respective protective regions overlap and at least one of the potentially conflicting locks provides for an exclusive write access type of lock. A higher level lock which would result from escalation may therefore conflict with an existing lock allocated by another process to protect overlapping regions of the same shared resource. For example, escalating one or more lower level locks on a shared resource to an exclusive write access higher level lock requires that no other processes have locks associated with the shared resource. For example, one or more shared read access lower level locks cannot be escalated to a higher level shared read access lock if another process has a portion of the same shared resource locked for exclusive read access.

Escalation Determination Methods

The methods of the present invention are operable to provide additional flexibility in defining criteria used in determining the desirability of escalating lower level locks to higher level locks. Prior techniques provide for simple comparison of the number of locks to a fixed threshold value. The methods of the present invention provide for comparing one or more operating parameter values of the computer system with a plurality of escalation threshold parameters. The escalation threshold parameters may be expressed as minimum or maximum threshold values or as minimum or maximum threshold percentage of a total value associated with the specific parameter. The various comparisons may be combined in a boolean predicate statement to provide for complex logical conditions as criteria for determining the desirability of escalating lower level locks to higher level locks.

In the best presently known mode of practicing the escalation methods of the present invention, a single threshold value is computed dynamically from a plurality of escalation threshold parameters. An operating parameter of the computing system is then compared to the threshold value determined as a function of a plurality of escalation threshold parameters. The desirability of performing the escalation of lower level locks to a higher level lock then depends upon the result of the comparison of the operating parameter to the computed threshold value.

In particular, in accordance with the best presently known mode of practicing the methods of the present invention, the number of low level locks allocated by a particular identified process for locking regions of a shared resource is the operating parameter to be compared against the computed threshold value. The computer threshold value is determined as a function of three escalation threshold parameters, namely: lock escalation percentage, minimum number of locks value, and maximum number of locks value. The minimum and maximum number of locks escalation threshold parameters are parameter values which indicate, respectively, the fewest locks allocated by a process before a lock escalation is considered desirable and the most locks allocated by a process before lock escalation is considered desirable. The lock escalation percentage is a percentage of the total number of locks available which may be allocated by a process before escalation is considered desirable.

A function to compute the threshold value for comparison with the current number of locks allocated by a process may be stated as a C language source code segment as follows:

```
if (LE_percent > 0) {
    threshold_value = (NLOCKS * LE_percent) * 100;
    if (threshold > LE_maxnumlocks)
        threshold_value = LE_maxnumlocks;
    else if (threshold_value < LE_minnumlocks)
        threshold_value = LE_minnumlocks;
}
else
    threshold_value = LE_maxnumlocks;
```

Due to the frequency of execution of the above computation, the code segment is preferably written as a macro operation to assure rapid in-line code execution. For example, the threshold_value variable may be computed by such a macro function each time a lock request is issued by the a process.

Once the threshold_value is computed, the present number of locks allocated to a process can simply be compared to the dynamically computed threshold value. As compared to prior techniques, the dynamic computation of the threshold value as a function of a plurality of escalation threshold parameters enables additional flexibility in defining the criteria for escalating low level locks to higher level locks.

Figure 3:
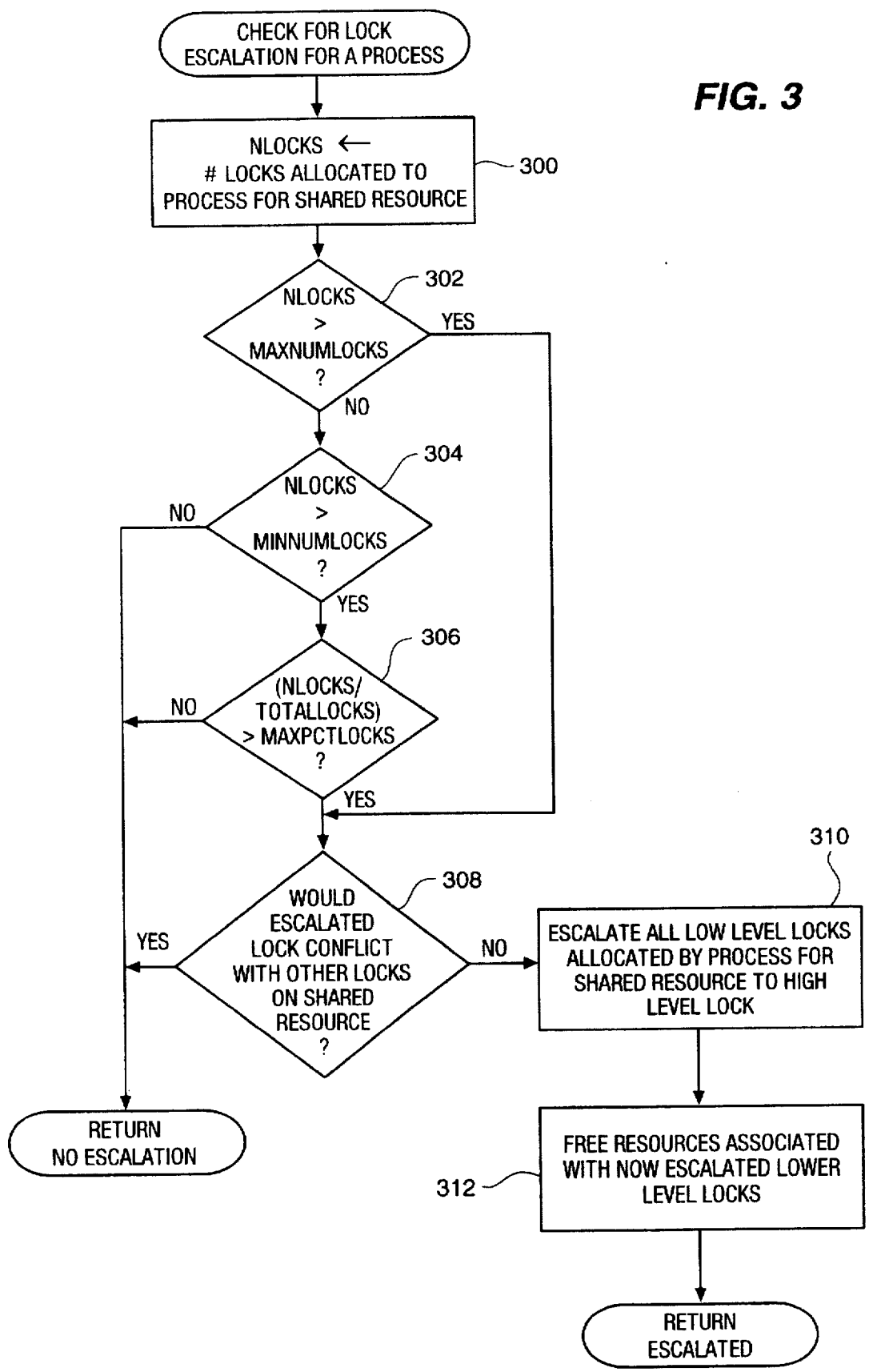
FIG. 3 is a flowchart describing the operation of methods of the present invention which dynamically determine the desirability of escalating lower level locks to higher level locks for an identified process.

FIG. 3 is a flowchart describing the operation of another embodiment of the methods of the present invention operable to determine the desirability of escalating locks. In this alternative embodiment, the determination of the desirability of escalating low level locks to higher level locks includes evaluation of an operating parameter of the system and comparison of the operating parameter value to a plurality of escalation threshold values. In particular, the method of the present invention depicted in the flowchart of FIG. 3 is operable to the number of lower level locks allocated by a particular process to regions (subcomponents) of a shared resource. The number of low level locks is then compared to three escalation threshold parameters, namely: the minimum value of the number of locks before escalation is desirable, the maximum number of low level locks before escalation is desirable, and the maximum percentage of locks allocated by the process as compared to the total number of locks available in the underlying operating system. A boolean predicate statement is evaluated based upon these comparisons to determine whether escalation of the low level locks is presently desirable. If so, an additional test is performed to assure that the potential escalation would not conflict with other locks allocated by other processes for regions of the shared resource. If the escalation is desirable and does not create any such conflicts, the method of the present invention then escalates all low level locks of the identified process to a single higher level lock and frees all resources associated with the now escalated lower level locks. The freed lower level locks may then be re-used to allocate and assign other locks on shared resources.

The method depicted in the flowchart of FIG. 3 is invoked at appropriate times in the operation of the computer system. For example, the method of FIG. 3 may be invoked each time a new lock is requested by operation of an application program. Before the new lock is allocated, any escalations of lower level locks may be performed to increase the number of available locks. Or, for example, when a new lock is requested but none are presently available, the method of FIG. 3 may be invoked to escalate lower level locks associated with the shared resource thereby freeing lower level locks to satisfy the request. If no escalation can be performed at the time of the request for a new lock, then the requesting process may be suspended pending availability of lower level locks. One of ordinary skill in the art will readily recognize that the method of FIG. 3 may be invoked in many ways to achieve the purpose of escalating lower level locks to higher level locks. The present invention focuses on the steps to determine the desirability of escalation of low level locks on behalf of an identified process rather than the timing of when the determination is best made.

In particular, element 300 is first operable to determine the number of lower level locks presently allocated to the identified process corresponding to regions of the shared resource. The variable NLOCKS is set to the value of the number of such presently allocated lower level locks. NLOCKS therefore is representative of the present value of an operating parameter of the computer system. Elements 302–306 are then operable to compare the NLOCKS variable to a plurality of escalation threshold parameter values to determine if escalation of the NLOCKS lower level locks to a single higher level lock is presently desirable. Element 302 first determines whether NLOCKS is greater than MAXNUMLOCKS (an escalation threshold parameter whose value represents the maximum number of low level locks to be allocated by a process before escalation is considered desirable). If NLOCKS exceeds MAXNUMLOCKS, escalation is desirable at this time and processing continues with element 308. Otherwise, element 304 is next operable to compare NLOCKS to MINNUMLOCKS (an escalation threshold parameter whose value represents the minimum number of low level locks to be allocated by a process before escalation is considered desirable). If NLOCKS exceeds MINNUMLOCKS, processing continues with element 306 for further evaluation. Otherwise, processing of the method is complete and escalation is not desirable at this time. Element 306 is operable to compare NLOCKS to MAXPCTLOCKS (an escalation threshold parameter whose value represents the maximum percentage of allocated lower level locks by the identified process versus the total number of locks in the computer system before escalation is considered desirable). If NLOCKS exceeds MAXPCTLOCKS, processing continues with element 308. Otherwise, processing of the method is complete and escalation is not desirable at this time.

Elements 302, 304, and 306, viewed as a whole, are operable to evaluate a boolean predicate statement based upon the comparison of at least one computer system operating parameter (the number of low level locks allocated by an identified process for a shared resource) against a plurality of escalation threshold parameters (the minimum and maximum number of locks and the maximum percentage of total locks allocated by a process) to determine the desirability of escalation of the lower level locks. The boolean predicate represented by elements 302, 304, and 306 determines that escalation is desirable if:

(NLOCKS>MAXNUMLOCKS) OR
((NLOCKS>MINNUMLOCKS) AND
(NLOCKS>MAXPCTLOCKS))

Element 308 is operable following a determination that escalation is presently desirable to determine whether such potential escalation would conflict with other locks allocated by processes for regions of the same shared resource. As noted above, a lock may conflict with other locks if their respective regions of protection overlap and the access types conflict. Specifically, the region protected by an exclusive write access lock cannot overlap with any region protected by either a shared read access lock or another exclusive write access lock.

Figure 4:
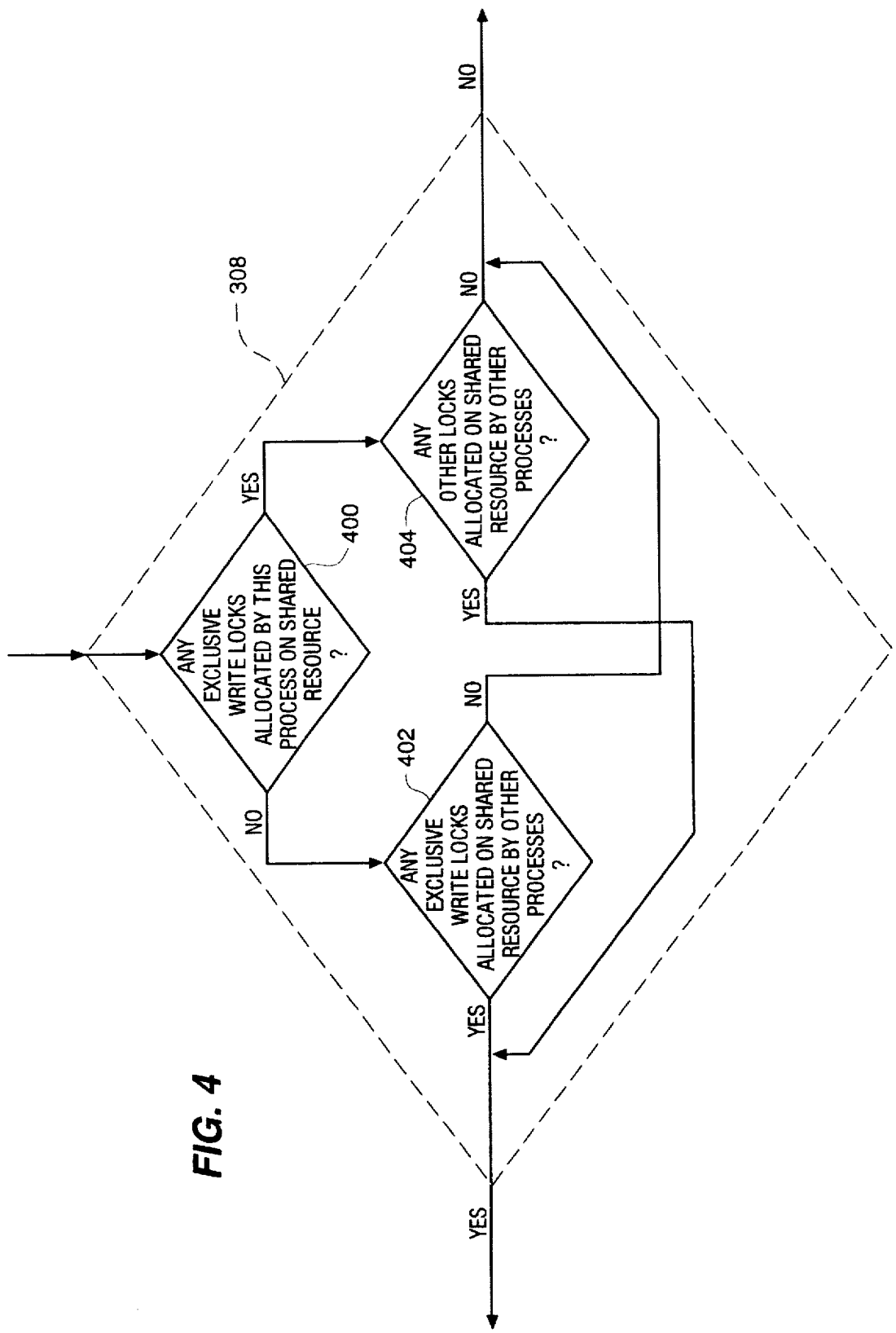
FIG. 4 is a flowchart describing additional detail of the conflict determination step of the method of FIG. 3.

FIG. 4 is a flowchart describing additional details of the operation of element 308. Element 400 of FIG. 4 first determines whether there are any exclusive write access lower level locks allocated by the identified process on the shared resource. If not, the lower level locks allocated by this process could be allocated to a shared read access type of higher level lock if there is no conflict and processing continues with element 402. Otherwise, the lower level locks allocated by this process must be escalated to an exclusive write access higher level lock and processing continues with element 404. Element 402 of FIG. 4 is operable to determine whether the potential escalation of the lower level locks to a higher level shared read access lock would conflict with any exclusive write access locks allocated on the shared resource by other processes. If so, processing of element 308 is completed with a determination that a conflict would arise if the proposed escalation were performed. If not, element 308 is completed with a determination that no conflict would arise by the proposed escalation. Element 404 of FIG. 4 is operable to determine whether the potential escalation of the lower level locks to a higher level exclusive write access lock would conflict with any locks allocated (of either access type) on the shared resource by other processes. If so, processing of element 308 is completed with a determination that a conflict would arise if the proposed escalation were performed. If not, element 308 is completed with a determination that no conflict would arise by the proposed escalation. Referring again to FIG. 3, if element 308 determines that the potentially escalated lock would conflict with other locks, then processing of the method is completed and escalation is not presently permissible (though desirable). Otherwise, processing continues with element 310.

Element 310 of FIG. 3 is operable to escalate all lower level locks allocated by the identified process by allocating a new higher level lock whose protection extends, at least, to all regions protected by the union of the lower level locks allocated by the identified process. In particular, as applied to database technologies, the new higher level lock provides protection for the entire database table for which specific regions were protected by the now escalated lower level locks. The lower level locks each provided protection for a smaller region such as a single record or a page of the database table. The higher level (table) lock therefore provides protection for at least the sum of all regions (pages or records) protected by the lower level locks now escalated. Element 312 is finally operable to complete processing of the method by freeing all resources allocated for the now escalated lower level locks. The freed resource (e.g., operating system mutex objects) are then available for re-use to allocate other locks for shared resources.

One of ordinary skill in the art will readily recognize that the order of steps 310 and 312 is potentially relevant depending upon the precise steps taken to allocate a new higher level lock and to free the lower level locks. In some instances, depending upon the design choices made in implementing the methods of the present invention, it may be necessary to free the lower level locks before allocating the new higher level lock in order to avoid potential deadlock situations. Such design choices and considerations are well known to those of ordinary skill in the art.

Figure 5:
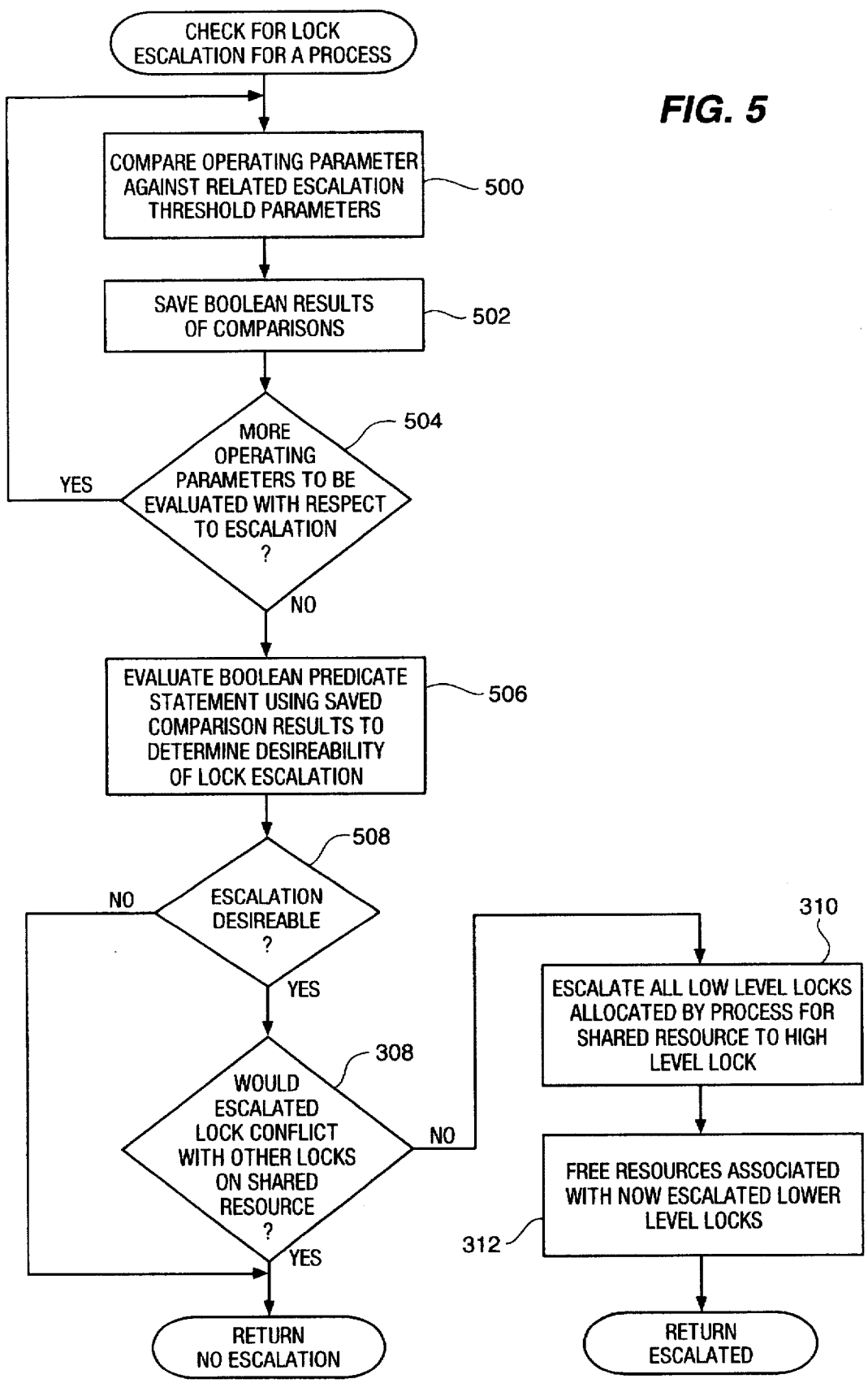
FIG. 5 is a flowchart describing the operation of methods of the present invention which dynamically determine the desirability of escalating lower level locks to higher level locks for an identified process.

FIG. 5 is a flowchart that describes the method of FIG. 3 in more general terms as may apply to escalation determinations in other application computing environments. As above with respect to FIG. 3, the method of FIG. 5 may be invoked at any time deemed appropriate for determining whether escalation of a process' lower level locks is both desirable and permissible.

Element 500 if FIG. 5 is first operable to compare a particular operating parameter of the computer system to related escalation threshold parameters. As noted above, escalation threshold parameters may include: minimum or maximum values of the operating parameter, minimum or maximum percentage of the operating parameter value as compared to total values, or comparison of one operating parameter value with another operating parameter value (e.g., a parameter value before and after an event so as to detect trends such as increasing or decreasing slopes in the parameter value). Each comparison performed by operation of element 500 results in a boolean result value for that comparison. Element 502 is then operable to save the boolean results of the comparisons performed by operation of element 500. The results may be saved, for example, in a temporary buffer (such as in RAM 110 of FIG. 1 ). Element 504 is then operable to determine if additional operating parameters are to be evaluated by operation of element 500 and 502. If so, processing continues by looping on operation of elements 500–504 until all operating parameters have been so evaluated. When all operating parameters have been evaluated, processing continues with element 506.

Element 506 evaluates a boolean predicate statement using the boolean results generated by operation of element 500 for each operating parameter and saved by operation of element 502. Any boolean predicate statement constructed from the boolean truth values generated and saved by elements 500 and 502 may be evaluated by operation of element 506. The truth of the evaluated boolean predicate statement determines the desirability of escalating the lower level locks of a process to a single higher level lock. Element 508 determines whether the boolean predicate statement evaluated by operation of element 506 indicates that the escalation is desirable. If the escalation is not presently desirable, processing of the method of FIG. 5 is completed and escalation is not performed. If element 508 determines that the boolean predicate statement indicates that escalation is presently desirable, processing continues with elements 308–312 as discussed above with respect to FIG. 3. Elements 308–312 perform further processing to determine whether the desired escalation may be performed without creating a conflict with other locks allocated for the shared resource by other processes. If the desired escalation may be performed without causing such a conflict, the lower level locks are escalated to a new higher level lock and resources previously associated with the now escalated locks are freed for re-use in other locks.

One of ordinary skill in the art will readily recognize that the methods discussed above and depicted in FIGS. 3–5 are descriptive of the escalation process performed on behalf of a single identified process and that the methods may be easily extended and expressed to perform the same processing for other processes. The methods may, for example, iteratively inspect the desirability of escalating lower level locks for all processes in each invocation of the methods. Such design choices and programming constructs are well known to those of ordinary skill in the art.

Automatic Tuning of Escalation Threshold Parameters

The escalation threshold parameters discussed above for use in determining the desirability of escalating lower level locks to a single higher level lock may be altered by, for example, a system administrator to tune the escalation thresholds for performance requirements of a particular computer system application environment. The tuning of parameters may be by any of several well known techniques in response to input from the system administrator. For example, the system administrator may alter the escalation threshold parameters defined in a process of re-building (re-linking) the operating system and associated libraries which utilize and include the methods of the present invention. Alternatively, the system administrator may modify the escalation threshold parameters through use of an interactive management tool which is capable of modifying parameters of the operating system in real time as the system is operating. In both cases, manual intervention of a system administrator user is required to tune the escalation threshold parameters in accordance with the particular performance needs of the computing environment.

Figure 6:
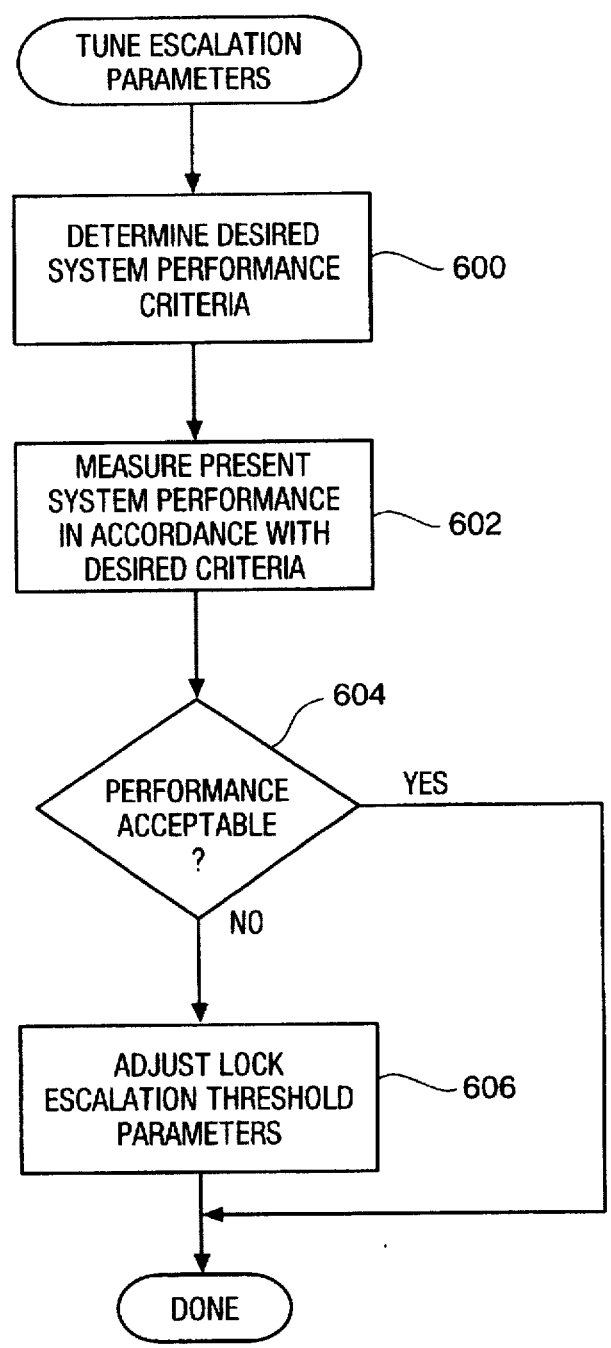
FIG. 6 is a flowchart describing methods of the present invention to automatically adjust the escalation threshold parameters utilized by the methods of FIGS. 3–5 above.

Methods of the present invention provide for automating the tuning of operating parameters of the computing environment. In particular, methods of the present invention measure the performance of the computer system with respect to pre-defined operating parameters and automatically adjust the escalation threshold parameters to improve the measured performance. FIG. 6 is a flowchart of the method of the present invention to automatically adjust the escalation threshold parameters used in the determination of desirability for escalating lower level locks to higher level locks on a shared resource. Element 600 is first operable to determine the desired (target) performance of the computing system. This is measured with respect to criteria which are affected by the escalation of locks from a lower level to a higher level. Element 602 then is operable to measure the present performance level of the computing system with respect to the identified operating parameters. Element 604 then determines whether the measured performance is at an acceptable level or requires additional tuning of the escalation threshold parameters. If additional tuning is required, element 606 is next operable to adjust the escalation threshold parameters to improve the measured system performance. Processing is then complete for the method of FIG. 6.

One of ordinary skill in the art will readily recognize that the method described above with respect to FIG. 6 may be performed in a periodic fashion or in response to specific events. For example, the method of FIG. 6 may be invoked in response to, or as a part of, the invocation of the methods of FIGS. 3–5. When a determination is made as to the desirability of escalating locks for one or more processes, the method of claim 6 may be invoked to adjust the escalation threshold values before or after the escalation determination is made. Alternatively, background (daemon) processing with the computer system may invoke the method of FIG. 6 on a periodic basis in response to the passage of time.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for dynamically escalating at least one lower granularity lock of a shared resource in a computing system to a higher granularity lock in said computing system said method comprising:

determining a present value of an operating parameter associated with operation of said computer system;

dynamically computing a plurality of escalation threshold parameters associated with operation of said computer system in real time;

comparing said present value of said operating parameter to said plurality of escalation threshold parameters associated with operation of said computer system; and escalating said at least one lower granularity lock to said higher granularity lock in positive response to said step of comparing said present value of said operating parameter to said plurality of escalation threshold parameters.

2. The method of claim 1 wherein each of said plurality of escalation threshold parameters is selected from the group consisting of: minimum threshold value, minimum threshold percentage of a total number of locks available, maximum threshold value, and maximum threshold percentage of a total number of locks available.

3. The method of claim 2 wherein said step of determining includes:

determining a present number of lower granularity locks associated with said shared resource allocated to a particular process.

4. The method of claim 3 wherein each of said plurality of escalation threshold parameters has a value associated therewith indicative of a number of locks in said computer system, and wherein said step of comparing includes:

comparing said present number of lower granularity locks to a maximum threshold value to determine that said present number of lower granularity locks exceeds said maximum threshold value; and determining that escalation of said at least one lower granularity lock to said higher granularity lock is presently desirable in response to said present number of lower granularity locks exceeding said maximum threshold value.

5. The method of claim 3 wherein said step of comparing includes:

comparing said present number of lower granularity locks to a minimum threshold value to determine that said present number of lower granularity locks exceeds said minimum threshold value;

comparing said present number of lower granularity locks to a maximum threshold percentage to determine that said present number exceeds said maximum threshold percentage; and determining that escalation of said at least one lower granularity lock to said higher granularity lock is presently desirable in positive response to said present number of lower granularity locks exceeding said minimum threshold value and exceeding said maximum threshold percentage.

6. The method of claim 1 including:

associating a value with each of said plurality of escalation threshold parameters; and adjusting said value associated with at least one of said escalation threshold parameters.

7. The method of claim 6 including:

determining additional operating parameters of said computer system prior to said adjusting step.

8. A method for dynamically escalating at least one lower granularity lock of a shared resource in a computing system to a higher granularity lock in said computing system method comprising:

determining a present number of lower granularity locks allocated by a single process in association with said shared resource;

comparing said present number of said lower granularity locks to a threshold number of locks value in said computer system to determine that said present number of lower granularity locks exceeds said maximum threshold number of locks value, wherein said maximum threshold number of locks is determined as a function of a plurality of dynamically computed escalation threshold parameters; and escalating said at least one lower granularity lock to said higher granularity lock in positive response to said present number of lower granularity locks exceeding said maximum threshold number of locks.

9. The method of claim 8 wherein each of said plurality of escalation dynamically computed threshold parameters is selected from the group consisting of: minimum threshold value, minimum threshold percentage of a total number of locks available, maximum threshold value, and maximum threshold percentage of a total number of locks available.

10. A program storage device readable by a computer, tangibly embodying a program or instructions executable by the computer to perform the method steps for dynamically escalating at least one lower granularity lock of a shared resource in a computing system to a higher granularity lock in said computing system, said method comprising:

determining a present value of an operating parameter associated with operation of said computer system;

dynamically computing a plurality of escalation threshold parameters associated with operation of said computer system in real time;

comparing said present value of said operating parameter to said plurality of escalation threshold parameters associated with operation of said computer system; and escalating said at least one lower granularity lock to said higher granularity lock in positive response to said step of comparing said present value of said operating parameter to said plurality of escalation threshold parameters.

11. The program storage device of claim 10 wherein each of said plurality of escalation threshold parameters is selected from the group consisting of: minimum threshold value, minimum threshold percentage of total, maximum threshold value, and maximum threshold percentage of total.

12. The program storage device of claim 11 wherein said step of determining includes:

determining a present number of lower granularity locks associated with said shared resource allocated to a particular process.

13. The program storage device of claim 12 wherein each of said plurality of escalation threshold parameters has a value associated therewith indicative of a number of locks in said computer system, and wherein said step of comparing method includes:

comparing said present number of lower granularity locks to a maximum threshold value to determine that said present number of lower granularity locks exceeds said maximum threshold value; and determining that escalation of said at least one lower granularity look to said higher granularity lock is presently desirable in response to said present number of lower granularity locks exceeding said maximum threshold value.

14. The program storage device of claim 12 wherein said step of comparing method includes:

comparing said present number of lower granularity locks to a minimum threshold value to determine that said present number of lower granularity locks exceeds said minimum threshold value;

comparing said present number of lower granularity locks to a maximum threshold percentage to determine that said present number exceeds said maximum threshold percentage; and determining that escalation of said at least one lower granularity lock to said higher granularity lock is presently desirable in positive response to said present number of lower granularity locks exceeding said minimum threshold value and exceeding said maximum threshold percentage.

15. The program storage device of claim 10 including:

associating a value with each of said plurality of escalation threshold parameters; and adjusting said value associated with at least one of said escalation threshold parameters.

16. The program storage device of claim 15 further including:

determining additional operating parameters of said computer system prior to said adjusting step.

17. A method for dynamically escalating at least one lower granularity lock of a shared resource in a computing system to a higher granularity lock in said computing system said method comprising:

determining a present value of an operating parameter associated with operation of said computer system;

dynamically computing a plurality of escalation threshold parameters that include at least one minimum threshold percentage value associated with operation of said computer system in real time;

comparing said present value of said operating parameter to said plurality of escalation threshold parameters associated with operation of said computer system; and escalating said at least one lower granularity lock to said higher granularity lock in positive response to said step of comparing said present value of said operating parameter to said plurality of escalation threshold parameters.

18. The method of claim 17 wherein each of said plurality of escalation threshold parameters is selected from the group consisting of: minimum threshold value, minimum threshold percentage of total, maximum threshold value, and maximum threshold percentage of total.

19. The method of claim 18 wherein said step of determining includes:

determining a present number of lower granularity locks associated with said shared resource allocated to a particular process.

20. The method of claim 19 wherein each of said plurality of escalation threshold parameters has a value associated therewith indicative of a number of locks in said computer system, and wherein said step of comparing includes:

comparing said present number of lower granularity locks to a maximum threshold value to determine that said present number of lower granularity locks exceeds said maximum threshold value; and determining that escalation of said at least one lower granularity lock to said higher granularity lock is presently desirable in response to said present number of lower granularity locks exceeding said maximum threshold value.

21. The method of claim 19 wherein said step of comparing includes:

comparing said present number of lower granularity locks to a minimum threshold value to determine that said present number of lower granularity locks exceeds said minimum threshold value;

comparing said present number of lower granularity locks to a maximum threshold percentage to determine that said present number exceeds said maximum threshold percentage; and determining that escalation of said at least one lower granularity lock to said higher granularity lock is presently desirable in positive response to said present number of lower granularity locks exceeding said minimum threshold value and exceeding said maximum threshold percentage.

22. The method of claim 17 including:

associating a value with each of said plurality of escalation threshold parameters; and adjusting said value associated with at least one of said escalation threshold parameters.

23. The method of claim 22 including:

determining additional operating parameters of said computer system prior to said adjusting step.

\* \* \* \* \*

UNITED STATES PATENT AND TRADEMARK OFFICE
CERTIFICATE OF CORRECTION

PATENT NO. : 5,737,611
DATED : April 7, 1998
INVENTOR(S) : Frederic Otto Vicik

It is certified that error appears in the above-identified patent and that said Letters Patent is hereby corrected as shown below:

Column 13, Line 67, replace "look" with --lock--

Signed and Sealed this

Thirtieth Day of June, 1998

BRUCE LEHMAN

*Attest:*

*Attesting Officer*    *Commissioner of Patents and Trademarks*